United States Patent
Firooz et al.

(10) Patent No.: US 6,237,091 B1
(45) Date of Patent: May 22, 2001

(54) METHOD OF UPDATING FIRMWARE WITHOUT AFFECTING INITIALIZATION INFORMATION

(75) Inventors: Jonathan Firooz; Michael O'Brien, both of Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/182,350

(22) Filed: Oct. 29, 1998

(51) Int. Cl.⁷ ..................................................... G06F 9/445
(52) U.S. Cl. ............................. 713/1; 713/100; 709/222; 710/10
(58) Field of Search .................................. 713/1, 2, 100; 709/220, 221, 222, 305; 717/11; 710/8, 10

(56) References Cited

U.S. PATENT DOCUMENTS

| | | | |
|---|---|---|---|
| 4,799,145 | * | 1/1989 | Goss et al. ............................. 364/200 |
| 4,954,941 | | 9/1990 | Redman . |
| 5,155,837 | | 10/1992 | Liu et al. . |
| 5,210,854 | | 5/1993 | Beaverton et al. ................... 395/500 |
| 5,268,928 | | 12/1993 | Herh et al. .............................. 375/8 |
| 5,317,723 | | 5/1994 | Heap et al. ............................ 395/500 |
| 5,450,589 | | 9/1995 | Maebayashi et al. ................ 395/700 |
| 5,519,869 | * | 5/1996 | Payne et al. ............................. 717/1 |
| 5,555,418 | * | 9/1996 | Nilsson et al. ........................ 395/700 |
| 5,566,335 | | 10/1996 | Nash et al. ............................ 395/700 |
| 5,568,358 | * | 10/1996 | Shelton ................................. 364/420 |
| 5,596,738 | | 1/1997 | Pope ...................................... 395/430 |
| 5,623,604 | | 4/1997 | Russell et al. ...................... 395/200.1 |
| 5,675,814 | * | 10/1997 | Pearce ................................... 713/300 |
| 5,682,533 | * | 10/1997 | Siljestroemer ........................ 707/200 |
| 5,764,992 | * | 6/1998 | Kullick et al. .......................... 717/11 |
| 5,781,921 | | 7/1998 | Nichols ................................. 711/115 |
| 5,784,625 | * | 7/1998 | Walker ................................. 710/220 |
| 5,922,072 | * | 7/1999 | Hutchinson ............................. 713/2 |
| 5,923,886 | * | 7/1999 | Chen et al. ............................. 717/11 |
| 5,930,504 | * | 7/1999 | Gabel ....................................... 712/2 |
| 5,974,470 | * | 10/1999 | Hammond ............................ 709/305 |
| 5,987,511 | * | 11/1999 | Elixmann et al. .................... 709/221 |
| 5,987,536 | * | 11/1999 | Johnson et al. ........................ 710/36 |
| 5,999,740 | * | 12/1999 | Rowley ................................. 717/11 |
| 6,009,274 | * | 12/1999 | Fletcher et al. ........................ 717/11 |

FOREIGN PATENT DOCUMENTS

411024936 * 1/1999 (JP) .

* cited by examiner

*Primary Examiner*—Thomas Lee
*Assistant Examiner*—Rijue Mai
(74) *Attorney, Agent, or Firm*—Augustus W. Winfield

(57) ABSTRACT

A firmware controlled device saves status and configuration information in a separate portion of memory that is not affected by a firmware update. In addition, information that may change during a firmware update, and may need to remain constant, is saved in the separate portion of memory that is not affected by a firmware update. In a first example embodiment, a reset process for the firmware controlled device is divided into two portions. In a first portion of the device reset process, the contents of the separate portion of memory are updated, either from firmware or by interaction with other devices. In a second portion of the device reset process, all other reset functions are performed. The first portion of the reset process is performed only during a power-on reset, or in response to an overall system reset. In particular, the first portion of the device reset process is not performed after a firmware update. In the second example embodiment, data that needs to remain constant are copied to the separate portion of memory as part of a firmware update process. Then, as part of a reset process, the device checks to see if a firmware update has occurred. If a firmware update has occurred, the data in the separate portion of memory are copied to the appropriate destinations, and the data in the separate portion of memory are cleared. As a result, for either example embodiment, the contents of the separate portion of memory are not disturbed during or after a firmware update, and a system reboot is not necessary after a device firmware update.

2 Claims, 3 Drawing Sheets

the first portion of the reset process after a power-on reset.

METHOD OF UPDATING FIRMWARE WITHOUT AFFECTING INITIALIZATION INFORMATION

FIELD OF INVENTION

This invention relates generally to microprocessor controlled devices and more specifically to modification of firmware without requiring the device to be shut down and without requiring an overall system reset.

BACKGROUND OF THE INVENTION

In many devices controlled by a microprocessor, there is a need for occasional modification or updates to the firmware. Historically, firmware was stored in a read-only-memory (ROM), and firmware modification was accomplished by replacing one or more ROMs. Replacement of ROMs typically required at least turning power off for a product and often required partial disassembly of a product. More recently, various types of programmable (write-once) or rewriteable nonvolatile memory is used, or sometimes battery powered volatile memory may be used. It is now common to send firmware updates electronically to a device and have the device modify or replace its own firmware. For example, modem firmware updates may be communicated over a telephone line and a modem may update its firmware without requiring opening of the modem's housing.

Typically, updating firmware in a running system may erase or change information that needs to remain unchanged until the next system reset. Typically, updating firmware in one device of a large system may require the entire system to be reset or rebooted. There is a need in some systems for the ability to update firmware within one device but to maintain integrity of some data and to continue operation without requiring an overall system reset or reboot. The following discussion provides two examples of devices where there is a need to preserve data during a firmware update. The first set of examples involves data being gathered and transmitted during initialization after a system reset. The second set of examples involves data that a device may need to communicate to other devices, or data that may affect external operation.

Many computer based systems undergo an automatic configuration process during an initialization process after power-on or during a reboot process. Typically, this requires all devices to run various initialization processes simultaneously. For example, for Intel compatible personal computers, one industry specification for automatically configuring I/O boards for the ISA bus is called the Plug and Play ISA Standards. For ISA Plug and Play, each compatible I/O card has a unique identifier that includes a vendor identifier and a serial number. Each compatible I/O card can read its own identifier. The host computer first places all the cards into a configuration mode. Then the host computer drives a line with a series of transitions indicating sequential bit positions within each identifier. As a result of interaction between the host computer and the I/O cards, one card is isolated and assigned a logical device number. The sequence is then repeated to isolate another card and so forth until all cards have been assigned a logical device number.

Another common interface standard is the Small Computer System Interface (SCSI). SCSI also requires a unique ID for each device. An industry group has proposed a set of specifications, called Plug and Play SCSI, which among other things provides automatic assignment of unique SCSI ID's. The particular protocol for assignment of unique ID's is called SCSI Configured AutoMagically (SCAM). Each SCAM compatible device has a default ID saved in a nonvolatile device memory. A SCAM master device first commands each of the other SCAM devices, one at a time, to go into an inactive state. Then, the master device uses a protocol similar to the protocol for ISA Plug and Play to isolate each device for assignment of a SCSI address.

There are other configuration protocols used by peripheral devices. If multiple devices are on one input/output port, devices may automatically configure themselves, at power-on, as primary and secondary devices. A device may need to record its own status (primary or secondary) and whether or not another device is sharing the same I/O cable.

In the second set of examples, some information that a device shares with other devices, or data that the device uses for various control functions, may change when firmware is updated. If the information is communicated to other devices only during power-on or reboot, then the information used by a device after a firmware update may be inconsistent or inappropriate. A system reboot may then be necessary. For example, consider again an identifier. Part of an identifier may indicate a firmware version or date code. Operating system software or other system devices may poll devices, at power-on or system reboot, and record a list of device identification numbers. Applications software may read such a list, and applications software may later refer to a specific device identifier. If a firmware update changes a device identifier, for example by changing a firmware version number, a system reboot may be required to update information gathered by the operating system or other system devices during system reboot. As an alternative example, consider a value, stored in firmware, that is written to a register of a control circuit during reset. If this value changes during a firmware update and the firmware is restarted, the control circuit output may change inappropriately.

From the above examples, there is a need for firmware updates that are transparent to a computer system or operator, so that a system reboot is not required.

SUMMARY OF THE INVENTION

A firmware controlled device, in accordance with the invention, saves status and configuration information in a separate portion of memory that is not affected by a firmware update. In addition, information that may change during a firmware update, and may need to remain constant, is saved in the separate portion of memory that is not affected by a firmware update. In one example embodiment, the data in the separate portion of memory are overwritten during a hard reset (power on reset or overall system reset). In a second example embodiment, data are copied to the separate portion of memory at the beginning of a firmware update.

In the first example embodiment, a reset process for the firmware controlled device is divided into two portions. In a first portion of the device reset process, the contents of the separate portion of memory are updated, either from firmware or by interaction with other devices. In a second portion of the device reset process, all other reset functions are performed. The first portion of the reset process is performed only during a power-on reset, or in response to an overall system reset. In particular, the first portion of the device reset process is not performed after a firmware update.

In the second example embodiment, data that needs to remain constant are copied to the separate portion of memory as part of a firmware update process. Then, as part of a reset process, the device checks to see if a firmware update has occurred. If a firmware update has occurred, the data in the separate portion of memory are copied to the appropriate destinations, and the data in the separate portion of memory are cleared.

As a result, for either example embodiment, the contents of the separate portion of memory are not disturbed during or after a firmware update, and a system reboot is not necessary after a device firmware update.

DETAILED DESCRIPTION OF THE PREFERRED EMBODIMENT OF THE INVENTION

Figure 1:
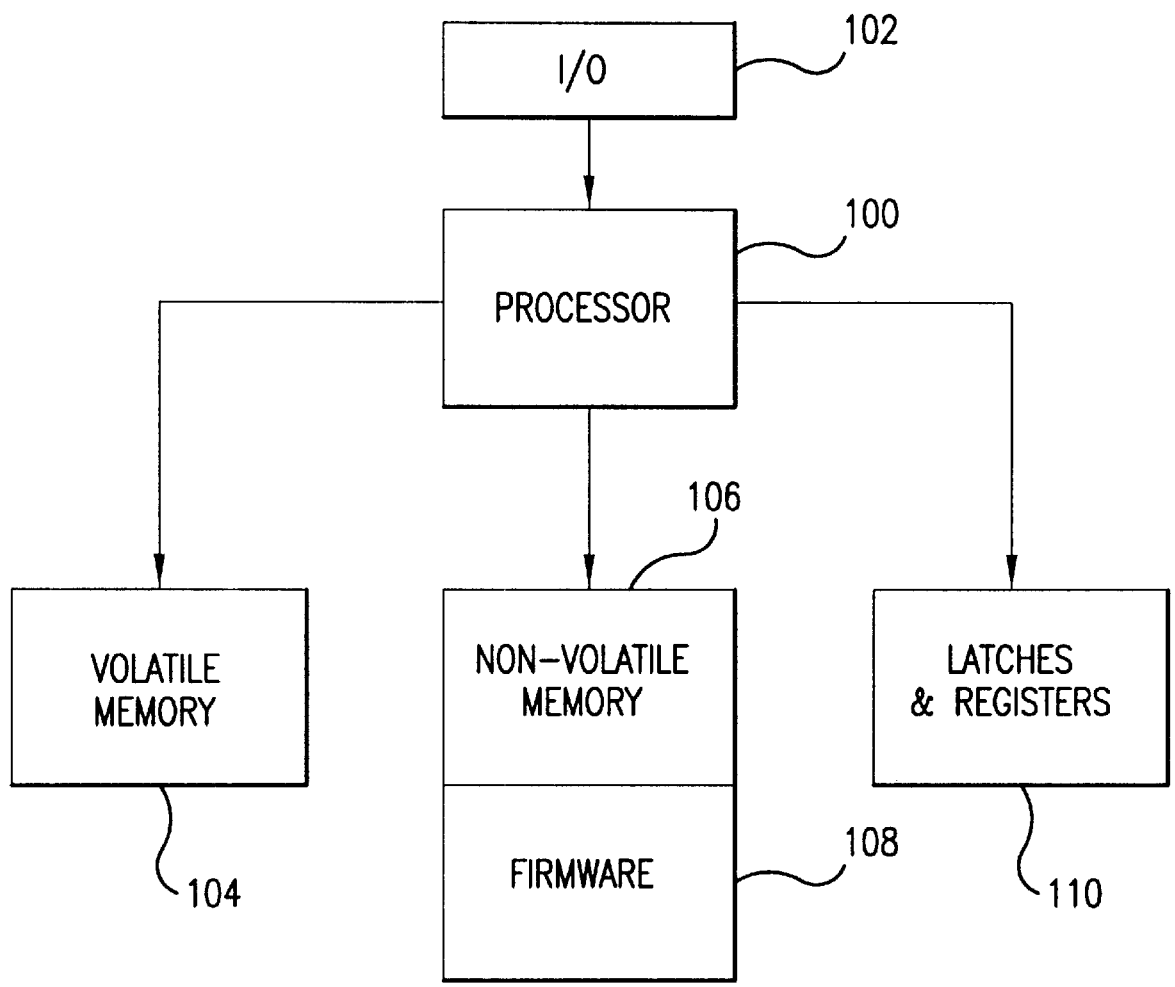
FIG. 1 is a lock diagram of a processor system capable of updating firmware in accordance with the invention.

FIG. 1 illustrates a block diagram of an example embodiment of a processor system, within a device, in accordance with the invention. A processor 100 can communicate externally (to other parts of the device, or externally to the device) through an input/output (I/O) port 102. The processor 100 can read and write to volatile memory 104, nonvolatile memory 106, and perhaps various latches and registers (110) within other device circuitry. The term "volatile memory" means that the stored information is lost when power is off. An example is RAM, and also latches and registers. The term "nonvolatile memory" means that stored information is not lost when power is off. Examples include read-only-memory (ROM), programmable read-only memory (PROM), electrically alterable read-only memory (EPROM), magnetic devices such as core memory, and may include a mass-memory medium, for example a tape or disk. Typically, firmware 108 resides in nonvolatile memory 106. However, as discussed below, the processor 100 may also execute code residing in volatile memory. Firmware 108 may include both instructions and data. New firmware, or modifications to firmware, may be received over the I/O port 102.

In the first example embodiment, during a power-on initialization sequence, or during a reset in response to an overall system reset, some information is saved in a separate area of memory other than within the area designated as firmware 108. In addition, some information may be read from the firmware 108 and stored in the separate area of memory. The separate area of memory may be within the volatile memory 104 or within the nonvolatile memory 106. When the firmware 108 is updated, the separate area of memory is not affected, either during the update or during a device soft reset after the update.

In the second example embodiment, during a firmware update, essential information is copied, from locations that are subject to change during the firmware update, to a separate area of memory. After the firmware update, a test is performed to see if a firmware update has occurred. If a firmware update has occurred, the information that was copied to the separate area of memory is copied back to its original location(s).

In the following discussion, an autoconfiguring device is used as an example to facilitate illustration. However, the invention is applicable to any device that needs to be able to update firmware without requiring an overall system power-on reset or reboot. The example device has an electronically readable identification that includes a firmware version number. The example device may share an I/O cable with at least one other device. Each device sharing the I/O cable must determine whether another device is present on the same I/O cable. If another device is present, each device sharing the I/O cable must execute a process to determine which device is the primary device and which device is the secondary device. This configuration information must be determined and saved during a power-on initialization or system reboot.

Figure 2:
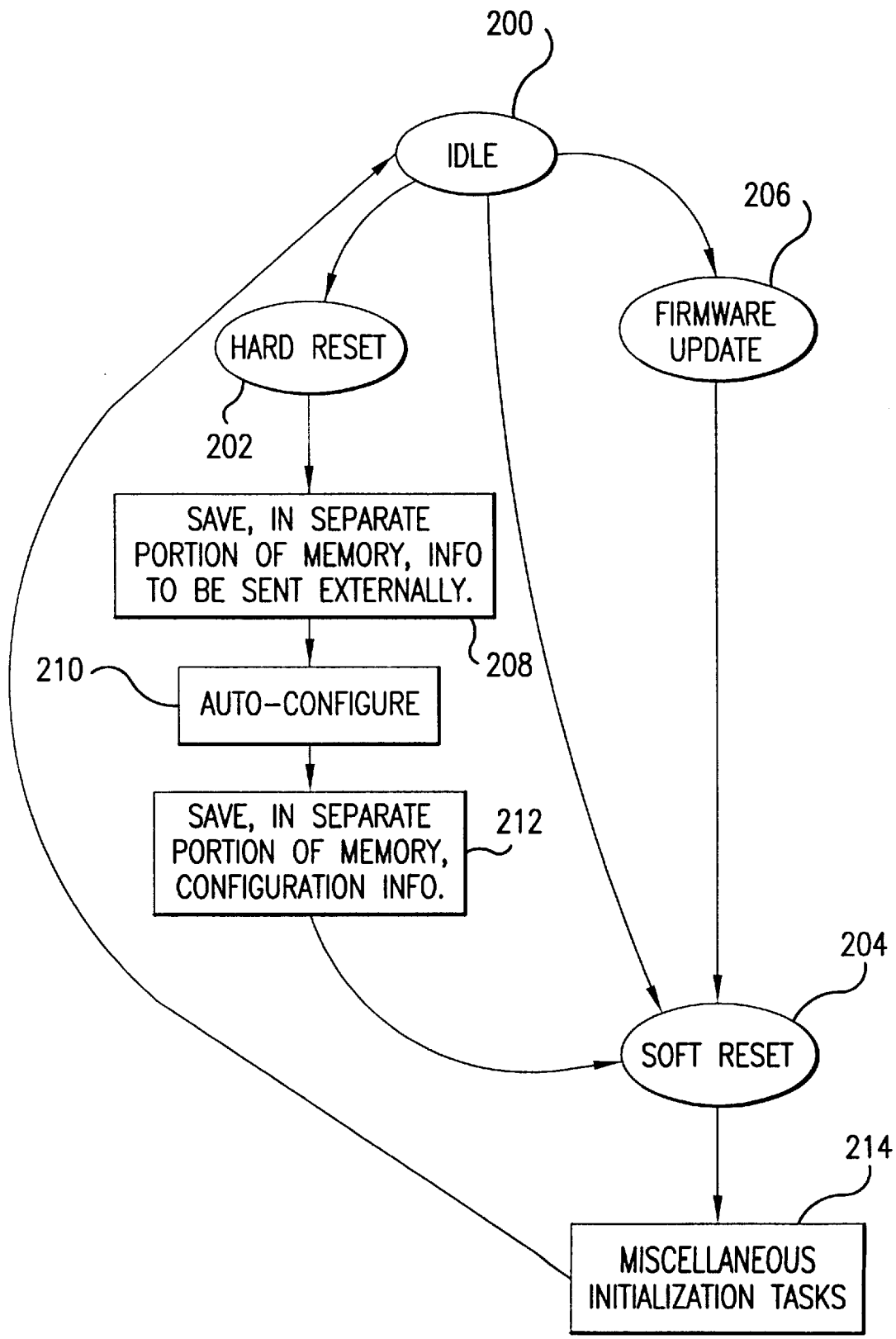
FIG. 2 is a state diagram and flow chart for a first example method of updating firmware in accordance with the invention.

FIG. 2 illustrates a first example embodiment of a portion of the firmware. In FIG. 2, the firmware is depicted as having an idle process 200, which may transfer to one of three other processes: a hard reset process 202, a soft reset process 204, or a firmware update process 206. Note that the terms "hard reset" and "soft reset" may be used for an overall system, but in FIG. 2 the terms refer only to processes within one firmware controlled device. The idle process (200) in FIG. 2 is just an example of process branching. There are many ways in which a process may branch to other processes. In general, a running process may be interrupted (for example, by a reset signal) or a process may check for certain conditions or flags to control branching to different processes.

If a hard reset is required (for example, a particular command, a power-on initialization, or a system interrupt or other signal indicating an overall system reset), the firmware copies some internal device-specific data, from nonvolatile memory that is subject to change during a firmware update, to a separate section of memory that is not subject to change during a firmware update (step 208). For example, the device identification may be used during autoconfiguration, and the device identification may change during a firmware update. In the example, at step 208, the device identification is copied into a part of memory that is not changed during a firmware update. Then, during autoconfiguration, and during operation until another hard reset, the copied version is used, not the original.

The separate section of memory may be in the nonvolatile memory 104, or the separate section of memory may be part of the nonvolatile memory 106. The choice may depend on the technology used for the nonvolatile memory. If nonvolatile memory can be partially modified, the firmware may copy some data, from nonvolatile memory that is subject to updating, to a separate part of the nonvolatile memory that is not subject to updating. However, if the nonvolatile memory must be entirely rewritten, then the data may be copied into the volatile memory. After autoconfiguration (step 210), configuration information is saved in the separate memory (either volatile memory or a portion of nonvolatile memory that is not changed during a firmware update) (step 212).

If a signal or command is received to update the firmware, non-changing update code reads the new firmware (for example, via the I/O port) and writes the new firmware into the nonvolatile memory (process 206). If the nonvolatile memory 106 can be partially modified, then a portion of the nonvolatile memory may be reserved for update code that does not change during a firmware update. The nonchanging update code then reads the new code and replaces the old. In FIG. 1, nonvolatile memory 106 is depicted as having a separate firmware section 108 that is updated. Alternatively, firmware update code may be copied from the nonvolatile memory to the volatile memory, and the processor 100 may then execute update code in the volatile memory during a firmware update. If update code is executed from volatile memory, the entire nonvolatile memory 106 may be updated. In some systems, the nonvolatile memory may be rewriteable, in which case old firmware may be overwritten. In other systems, the nonvolatile memory may be write-once, in which case the new firmware is written into a new area of memory and a pointer is changed to point to the new firmware instead of the old firmware.

After the firmware has been updated, the soft reset process (204) is entered. The soft reset process (204) comprises all the various tasks (step 214) involved in a reset process that don't impact the information saved in steps 208 and 212. For example, for mass memory peripherals, a transducer may need to be moved to a starting point.

Figure 3:
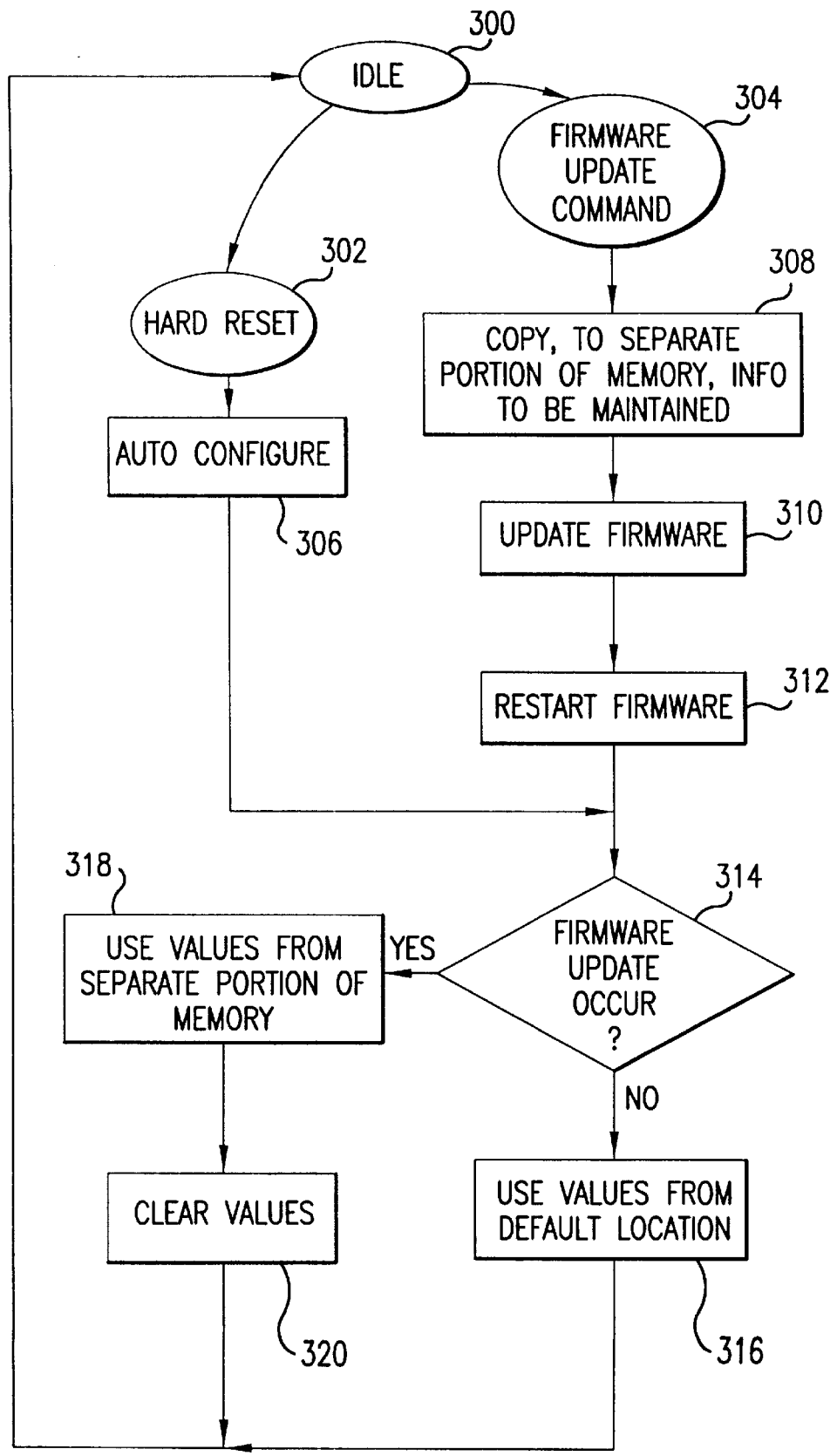
FIG. 3 is a state diagram and flow chart for a second example method of updating firmware in accordance with the invention.

The method illustrated in FIG. 2 may not be suitable for all devices. For example, some devices may not have the equivalent of hard reset and soft reset. In addition, in some devices, a slightly different result may be needed. Consider, for example, that during the reset process, firmware writes a value to a register (FIG. 1, 110) that is used by a control circuit. After a firmware update, that control value should not change, but after any reset, the current control value should be used. FIG. 3 illustrates a method suitable for the requirement just described. The firmware portion in FIG. 3 does not have a soft reset. The idle process 300 may branch to either a hard reset 302 or to a firmware update process 304. After a hard reset, the firmware performs an autoconfigure process 306. During a firmware update, some information is copied from a default location to the separate portion of memory (step 306). For example, a value that will be written to a register may be copied from a firmware location to the separate portion of memory. At steps 310 and 312, the firmware is updated and restarted. After either a hard reset or a firmware update, the firmware tests to see if a firmware update has occurred (step 314). For example, the firmware may check the separate portion of memory to see if it contains data or has been cleared. If no firmware update has occurred, the default values are used (step 316). If a firmware update has occurred (step 318), the firmware uses the values that were earlier copied to the separate portion of memory (that is, the values copied at step 308). As an alternative to step 318, if a value has already been written to a register, step 318 may be to do nothing. That is, instead of updating the destination register as in step 316, step 318 may simply leave the register undisturbed. In the firmware illustrated in FIG. 3, if a reset occurs, the new values are to be used, so the values saved in the separate portion of memory are cleared (step 320) immediately after being copied to the appropriate destinations (for example, a register).

The two methods illustrated in FIGS. 2 and 3 are not mutually exclusive, but instead may be merged, or portions of each may be used as appropriate. Each figure illustrates a slightly different solution depending on the needs of a device. Some information may need to survive a soft reset (FIG. 2) and other information may need to survive a firmware update but be refreshed after a reset (FIG. 3).

In summary, for the device and methods described above, the information saved in separate memory is not disturbed by the firmware update process, or by the device reset process immediately following a firmware update. As a result, an overall system reboot process is not required. Note that information transferred from firmware to the separate memory may be inaccurate after the software update and before the next system reboot (for example, a firmware version number may be incorrect), but this result may be preferable to requiring an immediate system reboot.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of changing firmware, the method comprising:

performing a configuration operation, by the firmware, when a hard reset is detected;

performing a soft reset operation, after the configuration operation, in which information from the configuration operation is used;

saving information obtained in the configuration operation, in a portion of memory that will not be changed during a firmware update, and then updating the firmware, when a need for a firmware update is detected;

performing the soft reset operation, by the updated firmware, using the saved information, without performing the configuration operation.

2. A method of changing firmware, the method comprising:

performing an initialization operation, by the firmware;

obtaining initialization information, by the firmware, during the initialization operation;

saving the initialization information in a portion of memory that will not be changed during a firmware update;

updating the firmware; and performing an initialization operation, by the updated firmware, using the initialization information that has been saved instead of obtaining new initialization information.

* * * * *

UNITED STATES PATENT AND TRADEMARK OFFICE
CERTIFICATE OF CORRECTION

PATENT NO.      : 6,237,091 B1  
DATED           : May 22, 2001  
INVENTOR(S)     : Jonathan Firooz et al.

It is certified that error appears in the above-identified patent and that said Letters Patent is hereby corrected as shown below:

<u>Title page, Item [54] and Column 1, line 1,</u>
Title, delete "METHOD OF UPDATING FIRMWARE WITHOUT AFFECTING INITIALIZATION INFORMATION" and insert therefor -- METHOD OF UPDATING FIRMWARE BY USING INFORMATION THAT WAS SAVED DURING SYSTEM INITIALIZATION OPERATION --

Signed and Sealed this

Twenty-sixth Day of November, 2002

*Attest:*

*Attesting Officer*

JAMES E. ROGAN
*Director of the United States Patent and Trademark Office*